United States Patent Office 2,801,988
Patented Aug. 6, 1957

2,801,988
STABILIZED HALOGEN CONTAINING VINYL RESIN COMPOSITIONS

Alfred Fischer, Bronx, N. Y., and Milton Nowak, Union, N. J., assignors, by mesne assignments, to Heyden Newport Chemical Corporation, a corporation of Delaware No Drawing. Application August 31, 1954, Serial No. 453,426

6 Claims. (Cl. 260—45.75)

This invention embodies additives adapted to be used in halogen containing vinyl resins for the purpose of rendering them better adapted for use in the manufacture of a wide variety of articles of commerce. It is well recognized that halogen containing vinyl resins are sensitive to light and heat and must be stabilized against these phenomena. Various stabilizers have been used for this purpose in the past, the most common being metal soaps, more particularly, stearates, laurates, ricinoleates and 2-ethylhexoates of calcium, strontium, barium, cadmium, zinc, lead and tin.

While these commercial stabilizers function with different degrees of efficiency for the purposes stated, these metal soaps thus used, either singly or in combination, possess limited effectiveness. The purpose of the present invention is to provide an additive which, when incorporated into a vinyl resin composition including a metal soap stabilizer, will materially increase the stability of the resulting composition.

We have found, as a result of prolonged experimentation and research, that certain organic trivalent derivatives of antimony will accomplish this result. These organic trivalent derivatives are characterized by the general formulation:

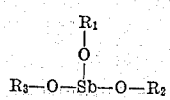

wherein $R_1$, $R_2$ and $R_3$ represent aryl, alkyl, alkaryl, arylalkyl, and acyl groups. The essential grouping in the foregoing formula is the following, namely:

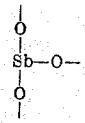

To this essential grouping may be linked a variety of organic residues, such, for example, as aryl, alkyl, acyl and substituted aryl, alkyl and acyl residues.

Examples typical of the compounds embraced within this invention and possessing effectiveness as additives are:

*Antimony acylates.*—Antimony laurate, myristate, palmitate, stearate, oleate, rincinoleate, 2-ethylhexoate, naphthenate, benzoate, salicylate, etc.

*Antimony alcoholates.*—The antimony alcoholates of 2-ethylhexanol, isooctyl alcohol, decanol, lauryl alcohol, 2-ethylhexanediol, monobutyl ether of ethylene glycol, tetrahydrofurfuryl alcohol, etc.

*Antimony aryloxides.*—Antimony phenoxide, cresoxide, xylenoxide, nonylphenoxide, etc.

*Intramolecular combinations of the above.*—Antimony monophenoxide di-2-ethylhexoate, dixylenoxide monooleate, monocresoxide, di-lauryl alcoholate, etc.

These organic trivalent antimony derivatives have the peculiar characteristic that, when incorporated to the extent of 0.1 to 4% in a vinyl resin composition including a metal soap stabilizer, they enhance the effectiveness to withstand light and heat far in excess of the sum of the individual action of the metal soaps and the additives. In other words, there is a definite synergistic action involved, which cannot be foreseen or expected, but which we have demonstrated to be the case. Although quantities of over 4% of the antimony additive compounds have proved to be likewise effect, we prefer to use these antimony additives in the range of 0.1 to 4%.

This action applies to a variety of halogen containing vinyl resins, such as polyvinyl halides, vinylidine halide polymers, as well as the copolymers thereof with vinyl acetate and other vinyl esters, styrene, acrylonitrile, ethyl metacrylate, and other unsaturated monomers capable of being polymerized.

The following examples are given by way of illustration and not by way of limitation.

EXAMPLE 1

A halogen-containing vinyl resin composition was prepared by milling together on a two-roll differential speed mill, a mixture of 100 parts of polyvinyl chloride resin, 50 parts of dioctyl phthalate plasticizer, 2 parts of a mixed barium-cadmium laurate stabilizer and ¼ part of an antimony phenoxide additive for 5 minutes at 330° F. A "control" sheet in which only the antimony phenoxide was omitted was milled in the same manner. Both sheets obtained in this manner were 35 mils thick. The "control" sheet containing only the commonly used stabilizer became dark yellow after being heated at 350° F. for 60 minutes and black after 120 minutes of heating. The "control" sheet turned yellow and developed many brown spots, after 300 hours of exposure to ultra-violet light. The improved vinyl sheet, containing our antimony phenoxide additive, exhibited no discoloration after 60 minutes of heating at 350° F. and turned a pale yellow after 120 minutes of heating. The improved vinyl sheet likewise exhibited no discoloration after 600 hours of exposure to ultra-violet light.

EXAMPLE 2

Example 1 was repeated with the following changes:

Resin: 100 parts of a vinyl chloride and vinylidene chloride copolymer

Plasticizer: 47 parts of a mixture consisting of: 42 parts of dioctyl phthalate and 5 parts of an epoxy plasticizer (manufactured by Rohm & Haas and known as "Paraplex G-62") a plasticizer containing an epoxidized vegetable oil Stabilizing system: 2½ parts of a liquid mixture which was dissolved in the plasticizer before being mixed with the resin and consisting of:

|  | Part |
|---|---|
| Barium 2-ethylhexoate | 1 |
| Zinc 2-ethylhexoate | ½ |
| Antimony 2-ethylhexoate | 1 |

Mill temperature: 280° F.

A "control" sheet in which only the antimony 2-ethylhexoate was omitted was also prepared and turned black after 60 minutes of heating at 350° F. Many small black spots developed in the "control" sheet after 400 hours of exposure to ultra-violet light. The improved vinyl sheet containing the antimony 2-ethylhexoate additive turned somewhat yellow after 750 hours of exposure to ultra-violet light.

EXAMPLE 3

Same procedure as Example 1 with the following modifications:

Resin: 100 parts of a vinyl chloride-vinyl acetate copolymer

Plasticizer: 43 parts of a mixture consisting of:

| | Parts |
|---|---|
| Dioctyl phthalate | 22 |
| Epoxy plasticizer | 5 |
| Tricresyl phosphate | 8 |
| Tetraethylene glycol dioctoate | 8 |

Stabilizer: ¾ of a part of cadmium laurate added separately to the resin.
Antimony additive: 1 part of antimony monocresylate di-2-ethylhexoate added separately to the plasticizer
Mill temperature: 280° F.

Once again, the "control" sheet in which the antimony additive was omitted was prepared. It turned to a dirty yellow-green color after 45 minutes and black after 75 minutes of heating at 350° F. The improved vinyl sheet containing the antimony additive exhibited no discoloration after 60 minutes and turned yellow after 120 minutes of heating at 350° F.

EXAMPLE 4

Same as Example 1, with the following modifications:

Resin: 100 parts of polyvinyl chloride
Plasticizer: 50 parts of dioctyl phthalate
Stabilizing system: 3 parts of a liquid mixture added to the plasticizer and consisting of:

| | Part |
|---|---|
| Barium 2-ethylhexoate | 1 |
| Cadmium 2-ethylhexoate | 1 |
| Antimony xylenoxide | 1 |

The "control" sheet containing no antimony additive became dark yellow after 60 minutes and black after 120 minutes of heating. When exposed to ultra-violet light, it discolored after 280 hours. The improved sheet containing the antimony xylenoxide additive exhibited no discoloration after 60 minutes and turned to a light straw color after 120 minutes of heating at 350° F. The improved sheet likewise exhibited no discoloration after 610 hours of exposure to ultra-violet light.

EXAMPLE 5

Same as Example 1 with the following modifications:

Resin: 100 parts of polyvinyl chloride
Plasticizer: 48 parts of a liquid mixture consisting of:

| | Parts |
|---|---|
| Dioctyl phthalate | 25 |
| Dioctyl sebacate | 23 |

Stabilizer: 1 part of barium ricinoleate added to the resin; 1 part of cadmium 2-ethylhexoate added to the plasticizer
Additive: ½ part of the antimony alcoholate of isooctyl alcohol; ½ part of the antimony alcoholate of 2-ethylhexanediol, both antimony additives being added to the plasticizer.

The "control" sheet containing neither of the antimony additives turned a black-green after 45 minutes of heating at 350° F. The improved sheet containing the combination of antimony additives exhibited no discoloration after 75 minutes of heating at 350° F.

EXAMPLE 6

Same as Example 1 with the following modifications:

Resin: 100 parts of polyvinyl chloride
Plasticizer: 50 parts of a mixture consisting of:

| | Parts |
|---|---|
| Dioctyl phthalate | 45 |
| Epoxy plasticizer (isooctyl epoxystearate) | 5 |

Stabilizing system: 3½ parts of a powdered mixture added to the resin and consisting of:

| | Parts |
|---|---|
| Calcium stearate | 2 |
| Zinc stearate | ½ |
| Antimony stearate | 1 |

The "control" sheet in which the antimony stearate was omitted turned black after 75 minutes of heating at 350° F. The improved vinyl sheet containing the antimony stearate turned a pale yellow after 120 minutes of heating at 350° F.

It is apparent from the foregoing examples that the additives of this invention function with high efficiency with a wide variety of resins and a wide variety of plasticizers and it is to be further noted that coloring and modifying agents may be present in the composition without affecting the efficiency of the additives.

It is to be further understood that the effectiveness of these additives is independent of the method or process employed in fabricating objects or items from the vinyl halogen containing resin compositions, these operations including extrusion, calendering, molding, milling, etc.

Our additives may be incorporated in the other constituents of the composition at the time of compounding it or the additives may be first commingled with conventional stabilizers and thereafter added as a complete stabilizing composition to the vinyl resin.

The foregoing detailed description sets forth the invention in its preferred practical forms, but the invention is to be understood as fully commensurate with the appended claims.

Having thus fully described the invention, what we claim as new and desire to secure by Letters Patent is:

1. A light and heat stabilized composition comprising: a halogen containing vinyl resin having incorporated therein at least one metal soap stabilizer, and an organic trivalent antimony compound of the formulation

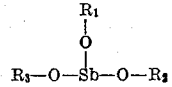

wherein $R_1$, $R_2$ and $R_3$ are selected from the group consisting of aryl, alkyl, acyl and substituted aryl, alkyl and acyl radicals, said antimony compound being present to the extent of at least 1/10 part to 4 parts per 100 parts by weight of the vinyl resin.

2. A composition according to claim 1, wherein the organic trivalent antimony compound is the antimony salt of 2-ethylhexoic acid.

3. A composition according to claim 1, wherein the organic trivalent antimony compound is the antimony salt of salicyclic acid.

4. A composition according to claim 1, wherein the organic trivalent antimony compound is the antimony alcoholate of 2-ethylhexanol.

5. A composition according to claim 1, wherein the organic trivalent antimony compound is antimony xylenoxide.

6. A composition according to claim 1, wherein the organic trivalent antimony compound is antimony di-2-ethylhexoate monoxylenoxide.

References Cited in the file of this patent

UNITED STATES PATENTS

| | | |
|---|---|---|
| 2,456,565 | Park | Dec. 14, 1948 |
| 2,488,975 | Hunter | Nov. 22, 1949 |
| 2,680,726 | Weinberg et al. | June 8, 1954 |
| 2,684,956 | Weinberg et al. | July 27, 1954 |

OTHER REFERENCES

Lally et al.: Modern Plastics, December 1949, pp. 111, 112, and 114.

Partridge et al.: Rubber Age, August 1950, pp. 553–560.